US012208727B2

(12) United States Patent
Yamasaki et al.

(10) Patent No.: US 12,208,727 B2
(45) Date of Patent: Jan. 28, 2025

(54) VEHICLE HAVING ROAD-SURFACE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/429,248

(22) Filed: Jan. 31, 2024

(65) Prior Publication Data
US 2024/0270155 A1   Aug. 15, 2024

(30) Foreign Application Priority Data

Feb. 14, 2023 (JP) ................................. 2023-021174

(51) Int. Cl.
*B60Q 1/14* (2006.01)
*B60Q 1/50* (2006.01)
*G06V 10/60* (2022.01)
*G06V 20/56* (2022.01)

(52) U.S. Cl.
CPC ............. *B60Q 1/143* (2013.01); *B60Q 1/545* (2022.05); *G06V 10/60* (2022.01); *G06V 20/588* (2022.01); *B60Q 2400/50* (2013.01)

(58) Field of Classification Search
CPC ........ B60Q 1/143; B60Q 1/545; G06V 10/60; G06V 20/588
See application file for complete search history.

(56) References Cited

U.S. PATENT DOCUMENTS

| 10,134,283 | B2 * | 11/2018 | Masuda | B60Q 9/008 |
|---|---|---|---|---|
| 10,604,063 | B2 * | 3/2020 | Kita | G06V 40/193 |
| 10,688,913 | B2 * | 6/2020 | Hiroi | B60Q 1/1423 |
| 11,029,689 | B2 * | 6/2021 | Hata | B60Q 1/085 |
| 11,066,006 | B2 * | 7/2021 | Kitazawa | F21S 41/65 |
| 11,417,057 | B2 * | 8/2022 | Atsmon | G06T 19/006 |
| 2014/0139673 | A1 * | 5/2014 | Kato | H04N 7/18 348/148 |

(Continued)

FOREIGN PATENT DOCUMENTS

| JP | 2015-164828 A | 9/2015 |
|---|---|---|
| JP | 2016-055691 A | 4/2016 |
| JP | 2020-111284 A | 7/2020 |

*Primary Examiner* — Bryon T Gyllstrom
(74) *Attorney, Agent, or Firm* — Rimon P.C.

(57) ABSTRACT

A vehicle having a road-surface rendering function includes a light projection member, a control unit, and a detection device. The light projection member is configured to perform light projection for road-surface rendering at least toward a road surface ahead of the vehicle. The control unit is configured to control the light projection for the road-surface rendering by the light projection member. The detection device is configured to perform detection of the road surface onto which the light projection member performs the light projection for the road-surface rendering. The control unit is configured to perform control to suppress the light projection for the road-surface rendering by at least determining insufficient reflection in the road-surface rendering in the vehicle based on the detection of the road surface by the detection device.

13 Claims, 10 Drawing Sheets

(56) References Cited

U.S. PATENT DOCUMENTS

| | | | |
|---|---|---|---|
| 2015/0371105 A1* | 12/2015 | Yang | G01B 11/254 |
| | | | 348/136 |
| 2016/0207443 A1* | 7/2016 | Widdowson | B60Q 1/0011 |
| 2017/0160744 A1* | 6/2017 | Chia | G05D 1/0212 |
| 2018/0150948 A1* | 5/2018 | Yamamoto | G06T 11/60 |
| 2018/0186278 A1* | 7/2018 | Song | B60Q 1/143 |
| 2020/0238892 A1* | 7/2020 | Maruyama | B60Q 1/076 |

* cited by examiner

FIG. 12
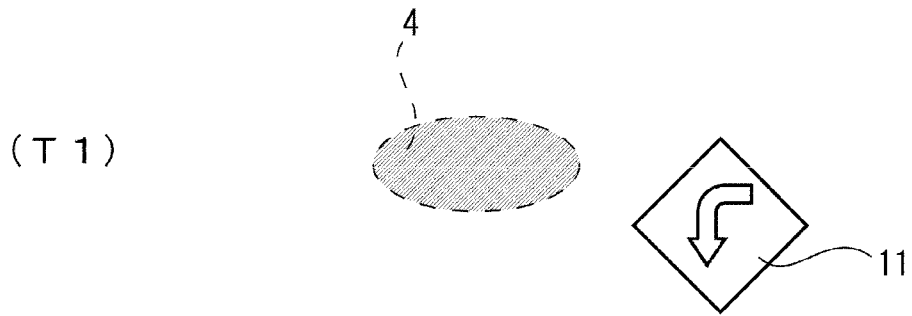
(T1)
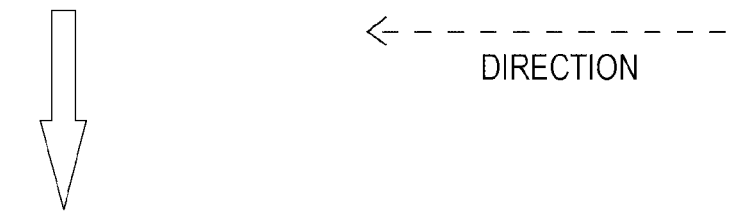
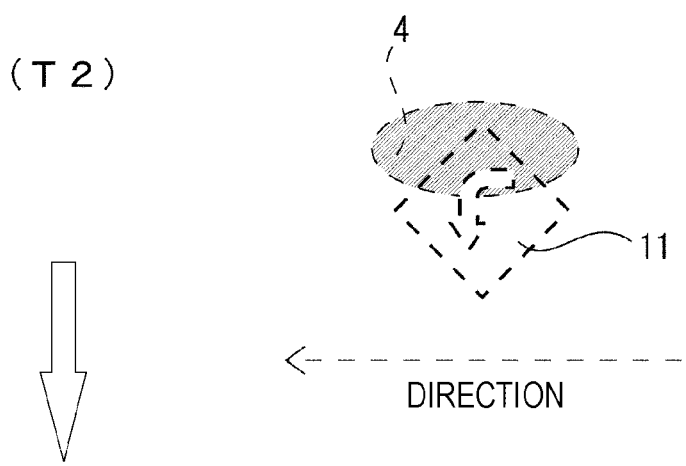
(T2)
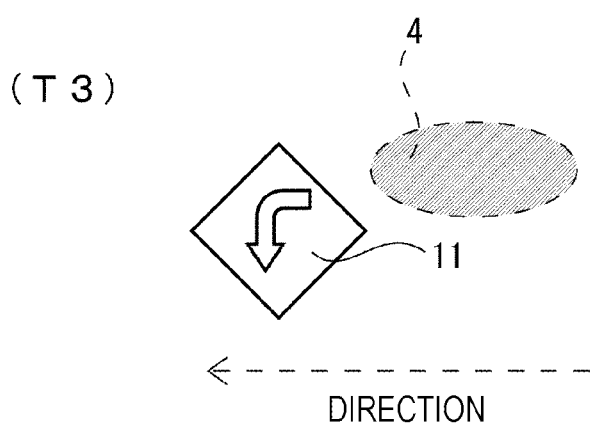
(T3)

VEHICLE HAVING ROAD-SURFACE RENDERING FUNCTION

CROSS-REFERENCE TO RELATED APPLICATIONS

The present application claims priority from Japanese Patent Application No. 2023-021174 filed on Feb. 14, 2023, the entire contents of which are hereby incorporated by reference.

BACKGROUND

Technical Field

The disclosure relates to vehicles having road-surface rendering functions.

Related Art

Japanese Unexamined Patent Application Publication Nos. 2016-055691, 2020-111284, and 2015-164828 disclose projecting light from a vehicle to render various patterns on a road surface on which the vehicle is traveling.

By rendering any of such patterns on the road surface, the vehicle can provide, via the road surface, travel-related information about the vehicle to the driver who drives the vehicle.

SUMMARY

An aspect of the disclosure provides a vehicle having a road-surface rendering function. The vehicle includes a light projection member, a control unit, and a detection device. The light projection member is configured to perform light projection for road-surface rendering at least toward a road surface ahead of the vehicle. The control unit is configured to control the light projection for the road-surface rendering by the light projection member. The detection device is configured to perform detection of the road surface onto which the light projection member performs the light projection for the road-surface rendering. The control unit is configured to perform control to suppress the light projection for the road-surface rendering by at least determining insufficient reflection in the road-surface rendering in the vehicle based on the detection of the road surface by the detection device.

An aspect of the disclosure provides a vehicle having a road-surface rendering function. The vehicle includes a light projection member and circuitry. The light projection member includes a light source and is configured to perform light projection for road-surface rendering at least toward a road surface ahead of the vehicle. The circuitry is configured to control the light projection for the road-surface rendering by the light projection member. The circuitry is configured to perform detection of the road surface onto which the light projection member performs the light projection for the road-surface rendering. The circuitry is configured to perform control to suppress the light projection for the road-surface rendering by at least determining insufficient reflection in the road-surface rendering in the vehicle based on the detection of the road surface.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 12 illustrates a change in the road-surface rendering under the road-surface rendering control in FIG. 11.

DETAILED DESCRIPTION

A road-surface rendered image rendered on the road surface as a result of projecting light from the vehicle is not limited to an image that can be visually recognized easily by the driver who drives the vehicle.

For example, when the road surface is to totally reflect light, the light projected from the vehicle for the road-surface rendering is mostly reflected toward, for example, an oncoming vehicle, thus resulting in a reduced quantity of light returning toward the vehicle that has projected the light. In this case, the road-surface rendered image viewed by the driver who drives the vehicle that has projected the light may possibly be a pale image that is difficult to visually recognize.

It is demanded that the road-surface rendered image rendered on the road surface be visually recognizable easily by, for example, the driver who drives the vehicle performing the road-surface rendering even when the headlamp device of the vehicle is turned on. The light used for the road-surface rendering is to have higher brightness than the headlamp device.

On the other hand, for example, when the road surface is to totally reflect light to cause intense regular reflection to occur, there is a concern that a driver who drives an oncoming vehicle or a pedestrian walking toward the vehicle may be irradiated with light more intense than the light from the headlamp via the road surface. Such intense reflection may also possibly occur partially in the road-surface rendered image.

It is desirable that the road-surface rendering from the vehicle be improved.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
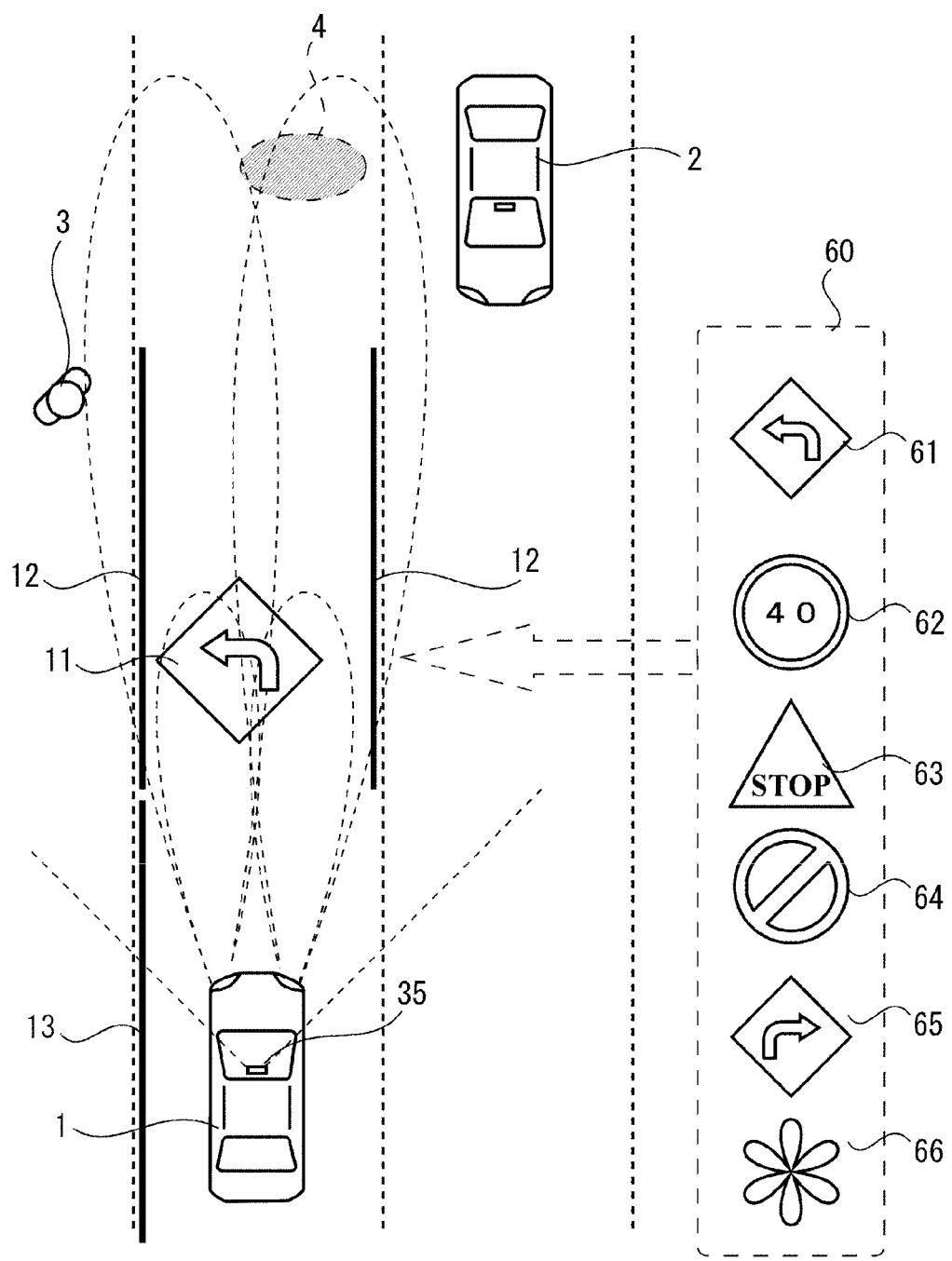
FIG. 1 illustrates an example of a traveling state of a vehicle according to an embodiment of the disclosure.

FIG. 1 illustrates an example of a traveling state of a vehicle 1 such as an automobile according to a first embodiment of the disclosure.

FIG. 1 illustrates the vehicle 1 traveling on one of lanes of a two-lane road. The automobile is an example of the vehicle 1. Other examples of the vehicle 1 include a bus, a truck, a motorcycle, and a personal mobility device. The vehicle 1 may be capable traveling based on autonomous driving including driving assistance.

An oncoming vehicle 2 is traveling on the opposite lane of the road. A pedestrian 3 is present on a road shoulder.

In such a travel environment, a driver who drives the vehicle 1 controls the vehicle 1 without causing the vehicle 1 to deviate from the road lane while paying attention to what is ahead in the traveling direction of the vehicle 1.

When the travel environment is dark, the vehicle 1 turns on the headlamp. In FIG. 1, the irradiation range of the headlamp in a low beam mode and the irradiation range of the headlamp in a high beam mode are indicated with dashed lines.

With regard to such an vehicle 1, rendering of patterns by radiating visible light onto the road surface from the vehicle 1 is being researched and developed.

For example, FIG. 1 illustrates a road-surface rendered image 11 based on a simple pattern mimicking a road sign, lane boundary lines 12 extending along the left and right sides of the lane of the vehicle 1, and a road-shoulder boundary line 13 rendered alongside the road shoulder of the vehicle 1. The road-surface rendered image 11 is rendered in front of the vehicle 1 in the traveling direction for the driver who drives the vehicle 1. The lane boundary lines 12 and the road-shoulder boundary line 13 are rendered toward the pedestrian 3 on the road shoulder and toward the oncoming vehicle 2.

The right side of FIG. 1 illustrates multiple light projection patterns 60 each serving as a basis for the road-surface rendered image 11. In this case, a light projection pattern 61 for a left-turn indication, a light projection pattern 62 for a speed-limit indication, a light projection pattern 63 for indicating a stop position, a light projection pattern 64 for a no-crossing indication, a light projection pattern 65 for a right-turn indication, and a histogram-based light projection pattern 66 for snowy or frozen road warning. The vehicle 1 may select any of the multiple light projection patterns 60 in accordance with the traveling state and the travel environment and may project light corresponding to the light projection pattern.

By rendering a pattern, such as the road-surface rendered image 11, on the road surface, the vehicle 1 can provide travel-related information about the vehicle 1 to, for example, the driver via the road surface.

However, even when light is projected from the vehicle 1 to render the road-surface rendered image 11 on the road surface in this manner, the road-surface rendered image 11 is not always visually recognizable easily by, for example, the driver who drives the vehicle 1.

For example, when the road surface is to totally reflect light, the light projected from the vehicle 1 for the road-surface rendering is mostly reflected toward, for example, an oncoming vehicle, thus resulting in a reduced quantity of light returning toward the vehicle 1 that has projected the light. In this case, even when road-surface rendering is executed, the road-surface rendered image viewed by the driver who drives the vehicle 1 that has projected the light may possibly be a pale image that is difficult to visually recognize.

Furthermore, in a situation where the headlamp device of the vehicle 1 is turned on, it is demanded that the road-surface rendered image 11 be visually recognizable easily by, for example, the driver who drives the vehicle 1 performing the road-surface rendering. In this case, the light used for the road-surface rendering is to have higher brightness than the headlamp device.

On the other hand, if the road surface is to totally reflect light to cause, for example, intense regular reflection to occur, the driver who drives the oncoming vehicle 2 and the pedestrian 3 walking toward the vehicle 1 may be irradiated with intense light via the road surface. The light for the road-surface rendering is totally reflected intensely by the road surface due to, for example, a puddle 4 on the road surface. Even when the intense reflection is in a part of the road-surface rendered image 11, there is a concern that the driver who drives the oncoming vehicle 2 may be irradiated with light that is more intense than the light from the headlamp.

Accordingly, it is desirable that the road-surface rendering function of the vehicle 1 be improved.

Figure 2:
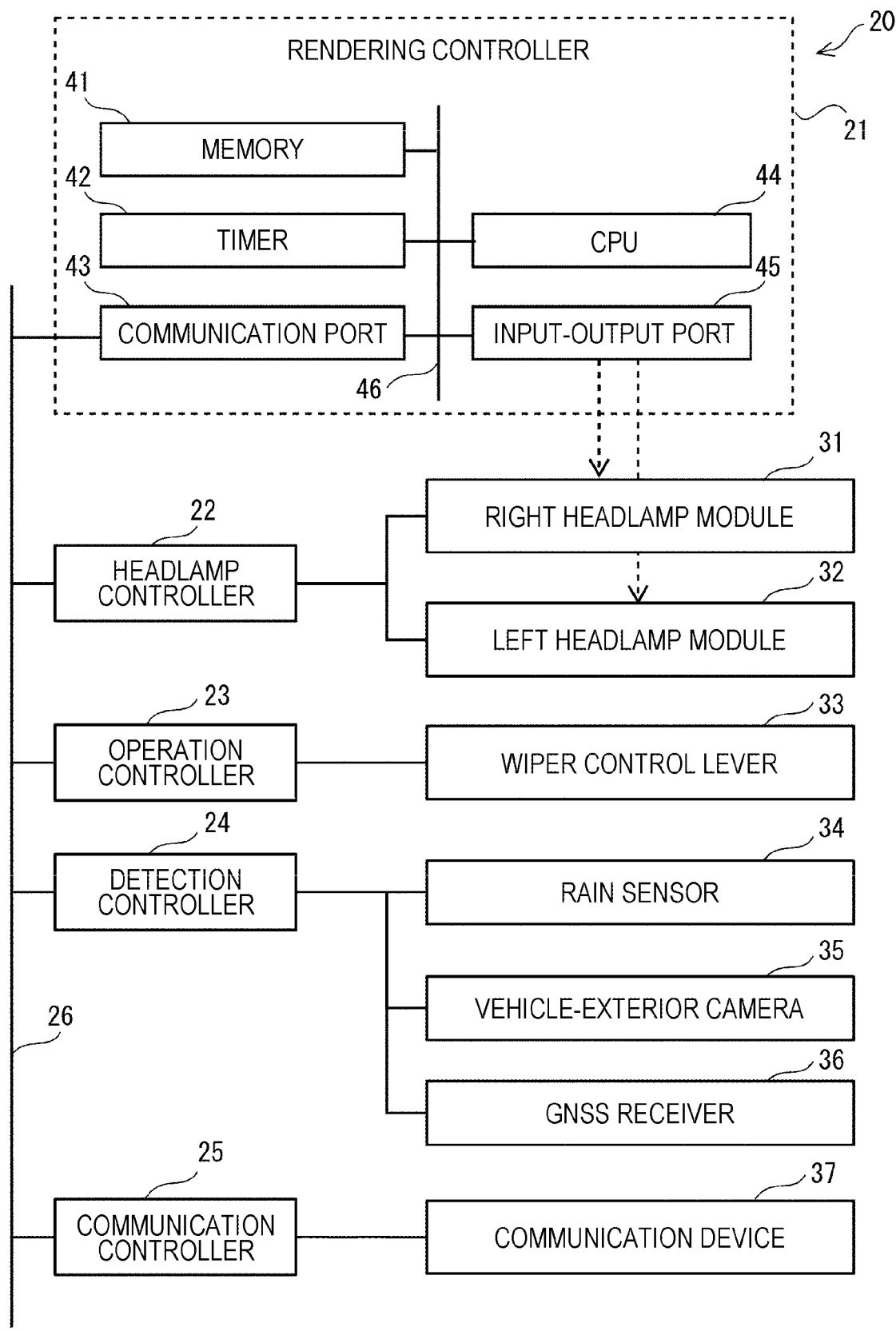
FIG. 2 illustrates a control system provided in the vehicle in FIG. 1.

FIG. 2 illustrates a control system 20 provided in the vehicle 1 in FIG. 1.

The control system 20 of the vehicle 1 in FIG. 2 has multiple controllers and a vehicle network 26 coupled thereto.

The vehicle network 26 may be a wired communication network compliant with, for example, a controller area network (CAN) or a local interconnect network (LIN) for the vehicle 1. The vehicle network 26 may be a communication network, such as a local area network (LAN), or a combination of the above. The vehicle network 26 may partially include a wireless communication network. The aforementioned devices coupled to the vehicle network 26 can exchange information with one another via the vehicle network 26.

FIG. 2 also illustrates a rendering controller 21, a headlamp controller 22, an operation controller 23, a detection controller 24, and a communication controller 25 as examples of the multiple controllers. The vehicle network 26 may also be coupled to controllers other than the above, such as a travel controller and an air-conditioning controller. Each controller illustrated in FIG. 2 may be split into multiple units and be coupled to the vehicle network 26.

The headlamp controller 22 is coupled to a right headlamp module 31 and a left headlamp module 32 that are provided at the front end of the vehicle 1. The right headlamp module 31 and the left headlamp module 32 are headlamp members that project light forward of the vehicle 1.

As will be described later, the right headlamp module 31 and the left headlamp module 32 according to this embodiment each have a light projection module 53 for road-surface rendering. In this embodiment, the light projection module 53 of the right headlamp module 31 and the light projection module 53 of the left headlamp module 32 serve as light projection members capable of projecting light for road-surface rendering at least toward the road surface ahead of the vehicle 1. That is, the light projection member(s) may include a light source.

The headlamp controller 22 controls the on mode of the right headlamp module 31 and the on mode of the left headlamp module 32 in accordance with information acquired via the vehicle network 26. Such information includes operational information about a lamp control lever (not illustrated) and information about a detection value of a light quantity sensor for an automatic light (not illustrated). Normally, the lamp control lever can be set in any of operational modes including a low beam mode, a high beam mode, and an off mode.

The headlamp controller 22 may output the information about the on mode of the right headlamp module 31 and the on mode of the left headlamp module 32 to another controller via the vehicle network 26.

The operation controller 23 is coupled to other operational members to be operated by an occupant, such as the driver. FIG. 2 illustrates a wiper control lever 33 as an operational member. The wiper control lever 33 is used for controlling the operation of a wiper device (not illustrated) for wiping the outer surface of the windshield of the vehicle 1. Normally, the wiper control lever 33 can be set in any of operational modes including an intermittent driving mode, a continuous driving mode, a high-speed continuous driving mode, and a stop mode.

The detection controller 24 may output the information about the operational modes of the various operational members, such as the wiper control lever 33, to another controller via the vehicle network 26.

The detection controller 24 is coupled to various detection members for detecting, for example, the traveling state and the travel environment of the vehicle 1. FIG. 2 illustrates a rain sensor 34, a vehicle-exterior camera 35, and a global navigation satellite system (GNSS) receiver 36 as the detection members.

The detection controller 24 may output, for example, detection information of the rain sensor 34 to another controller via the vehicle network 26.

The rain sensor 34 is provided on the outer surface of the windshield of the vehicle 1 and can detect rain and the amount of rainfall based on a change in an electrified state according to wetness caused by raindrops on the rain sensor 34.

As illustrated in FIG. 1, the vehicle-exterior camera 35 is provided facing forward in a vehicle cabin located within the windshield of the vehicle 1. The vehicle-exterior camera 35 can capture an image forward of the vehicle 1 in the traveling direction thereof. The vehicle-exterior camera 35 may include multiple vehicle-exterior cameras provided in the vehicle 1. The multiple vehicle-exterior cameras 35 may capture images of the environment surrounding the vehicle 1 in a split fashion. Alternatively, the vehicle-exterior camera 35 may be a 360° camera or a stereo camera.

The captured image obtained by the vehicle-exterior camera 35 may include, as a detection image, an image rendered on the road surface in accordance with light projection.

In addition to the vehicle-exterior camera 35, other devices that detect the environment surrounding the vehicle 1 include a Lidar and a laser. Similar to the captured image obtained by the vehicle-exterior camera 35, detection information obtained by the Lidar and the laser can be used as information about the environment surrounding the vehicle 1.

The vehicle-exterior camera 35, the Lidar, and the laser provided in the vehicle 1 may serve as detection devices capable of detecting the road surface onto which the light projection members project light for road-surface rendering.

The GNSS receiver 36 receives radio waves from multiple GNSS satellites and detects positional information and time information about the vehicle 1 provided with the GNSS receiver 36.

The communication controller 25 is coupled to a communication device 37. The communication device 37 exchanges information with a server via, for example, a base station (not illustrated). The base station may be, for example, a 5G base station, an advanced driver-assistance system (ADAS) base station, or an intelligent transport system (ITS) base station. A 5G base station may be capable of implementing a server function. The communication device 37 may directly communicate with, for example, another vehicle 1 by vehicle-to-X (V2X) communication.

The communication controller 25 may transmit information acquired from the vehicle network 26 from the communication device 37 to the base station or the server, or may output information received by the communication device 37 from the base station or the server to the vehicle network 26.

The rendering controller 21 has a memory 41, a timer 42, a communication port 43, an input-output port 45, a central processing unit (CPU) 44, and an internal bus 46 coupled to these units. Each controller provided in the control system 20 may basically have the same structure as the rendering controller 21.

The input-output port 45 is coupled to the right headlamp module 31 and the left headlamp module 32.

The communication port 43 is coupled to the vehicle network 26. The communication port 43 acquires information from the vehicle network 26 and outputs information output by the rendering controller 21 to the vehicle network 26.

The timer 42 measures a time period or a time point. The time point measured by the timer 42 may be corrected in accordance with a time point obtained by the GNSS receiver 36.

The memory 41 may include, for example, a semiconductor memory, a hard disk drive (HDD), and a random access memory (RAM). The HDD is a nonvolatile memory. The RAM is a volatile memory. The memory 41 stores, as data, a program to be executed by the CPU 44 and various kinds of information to be used during the execution of the program. For example, the memory 41 stores data of the multiple light projection patterns 60 illustrated in FIG. 1.

The CPU 44 loads and executes the program stored in the memory 41. Accordingly, the CPU 44 serves as a control unit of the rendering controller 21. In this embodiment, the CPU 44 serves as a control unit that controls the light projection for the road-surface rendering by the light projection members.

The CPU 44 serving as a control unit controls the operation of the rendering controller 21. Furthermore, the CPU 44 serving as a control unit outputs signals to the right headlamp module 31 and the left headlamp module 32 via the communication port 43. Accordingly, the CPU 44 serving as a control unit controls the light projection modules 53 for road-surface rendering provided in the right headlamp module 31 and the left headlamp module 32. The right headlamp module 31 and the left headlamp module 32 emit light based on a light projection pattern for road-surface rendering. For example, as illustrated in FIG. 1, the road-surface rendered image 11 corresponding to the light projection pattern may be rendered on the road surface.

Figure 3:
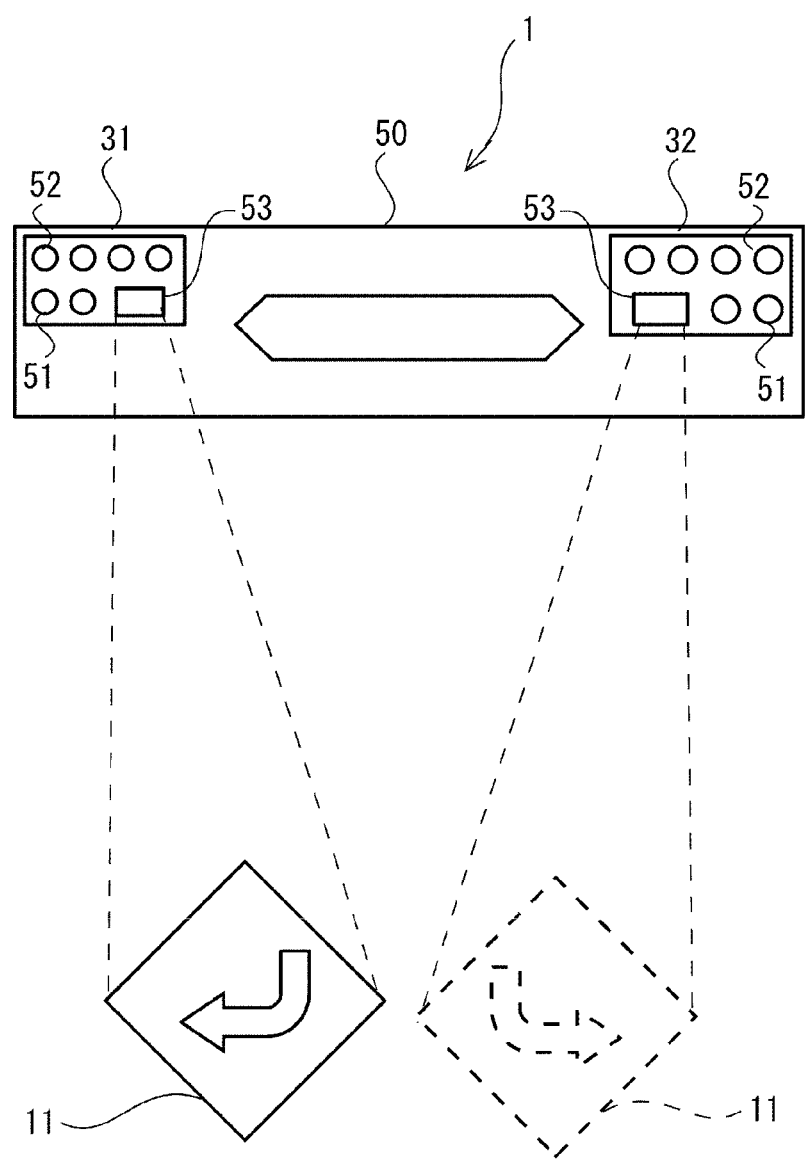
FIG. 3 schematically illustrates the structure and the disposition of a right headlamp module and a left headlamp module at the front end of the vehicle in FIG. 1.

FIG. 3 schematically illustrates the structure and the disposition of the right headlamp module 31 and the left headlamp module 32 at the front end of the vehicle 1 in FIG. 1.

FIG. 3 illustrates the front end of the vehicle 1.

The right end at the front end of the vehicle 1 is provided with the right headlamp module 31. The right headlamp module 31 has multiple low-beam light-emitting diodes (LEDs) 51, multiple high-beam LEDs 52, and a micro-electro-mechanical system (MEMS) light projection module 53.

The left end at the front end of the vehicle 1 is provided with the left headlamp module 32. The left headlamp module 32 has multiple low-beam LEDs 51, multiple high-beam LEDs 52, and a MEMS light projection module 53.

The light projection modules 53 may alternatively be, for example, digital micro-mirror device (DMD) light projection modules.

For example, each MEMS light projection module 53 may be configured to project light by reflecting three primary colors of light by using a MEMS element. The reflection mode of the MEMS element may be controlled in accordance with an image signal.

The right headlamp module 31 or the left headlamp module 32 may be capable of rendering an image other than that of the MEMS light projection module 53 on the road surface.

Each MEMS light projection module 53 may be capable of projecting light within the irradiation range of all of the multiple low-beam LEDs 51 and the multiple high-beam LEDs 52, as well as projecting light outside the irradiation range. The rendering pattern for the no-crossing indication for the pedestrian 3 in FIG. 1 is partially outside the irradiation range of all of the multiple low-beam LEDs 51 and the multiple high-beam LEDs 52.

In FIG. 3, the MEMS light projection module 53 of the right headlamp module 31 projects light, so that a road-surface rendered image 11 for a right-turn indication corresponding to the right-turn-indication light projection pattern 65 is rendered on the road surface.

Furthermore, the MEMS light projection module 53 of the left headlamp module 32 projects light, so that a road-surface rendered image 11 for a left-turn indication corresponding to the left-turn-indication light projection pattern 61 is rendered on the road surface.

The MEMS light projection module 53 of the right headlamp module 31 and the MEMS light projection module 53 of the left headlamp module 32 may operate in cooperation with each other to render a single large road-surface rendered image 11 on the road surface, as illustrated in FIG. 1.

The CPU 44 serving as a control unit controls the MEMS light projection module 53 of the right headlamp module 31 and the MEMS light projection module 53 of the left headlamp module 32 in accordance with a light projection pattern, so as to be capable of rendering a road-surface rendered image 11 corresponding to the light projection pattern on the road surface.

Accordingly, the MEMS light projection module 53 of the right headlamp module 31 and the MEMS light projection module 53 of the left headlamp module 32 can serve as light projection members that project the road-surface rendered image 11 in accordance with the light projection pattern.

As illustrated in FIG. 1, the MEMS light projection module 53 of the right headlamp module 31 may project light for road-surface rendering such as to exclude the front end with respect to the high-beam light projection range on the road surface by the right headlamp module 31.

Moreover, as illustrated in FIG. 1, the MEMS light projection module 53 of the left headlamp module 32 may project light for road-surface rendering such as to exclude the front end with respect to the high-beam light projection range on the road surface by the left headlamp module 32.

Figure 4:
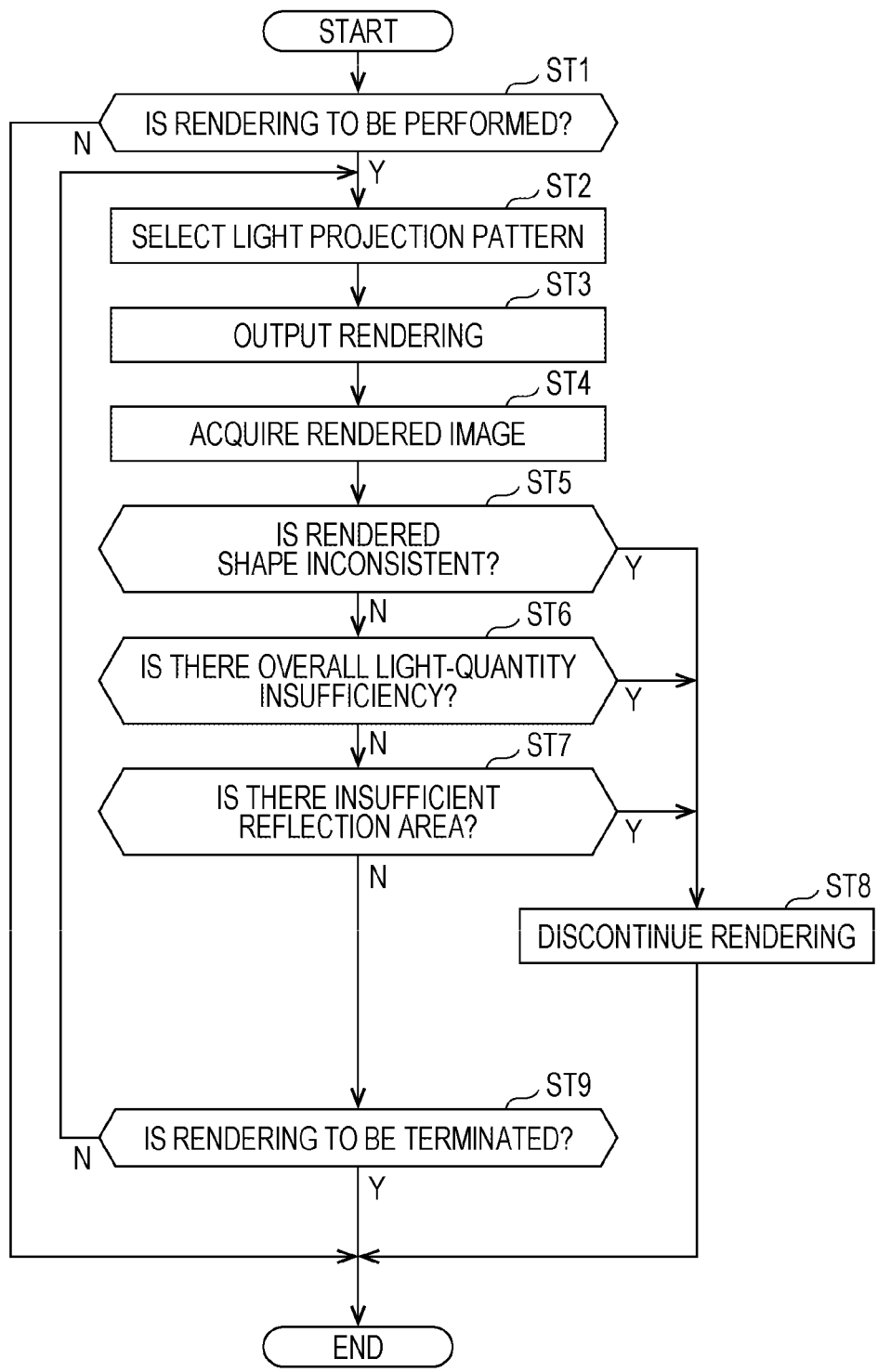
FIG. 4 is a flowchart of road-surface rendering control according to the embodiment executed by a rendering controller in FIG. 2.

FIG. 4 is a flowchart of road-surface rendering control according to the first embodiment executed by the rendering controller 21 in FIG. 2.

The CPU 44 serving as a control unit of the rendering controller 21 repeatedly executes the road-surface rendering control in FIG. 4.

When a rendering control function is implemented in the headlamp controller 22 in the control system 20, the CPU 44 of the headlamp controller 22 may serve as a control unit that repeatedly executes the road-surface rendering control in FIG. 4.

In step ST1, the CPU 44 that controls light projection for road-surface rendering determines whether road-surface rendering is to be performed. A request for road-surface rendering may be generated by each controller in the control system 20. For example, when the headlamp is to be turned on, the headlamp controller 22 may generate information for requesting road-surface rendering and output the information to the rendering controller 21 via the vehicle network 26. When there is a request for road-surface rendering, the CPU 44 causes the process to proceed to step ST2. When there is no request for road-surface rendering, the CPU 44 ends the control.

In step ST2, the CPU 44 selects a light projection pattern to be used for the road-surface rendering from the multiple light projection patterns 60 stored in the memory 41. The CPU 44 may select multiple light projection patterns or may select one light projection pattern.

In step ST3, the CPU 44 controls the light projection module 53 of the right headlamp module 31 and the light projection module 53 of the left headlamp module 32 to irradiate the road surface with light according to the selected light projection pattern. Accordingly, a road-surface rendered image 11 corresponding to the light projection pattern is rendered on the road surface.

In step ST4, the CPU 44 acquires a captured image obtained by the vehicle-exterior camera 35. The captured image obtained by the vehicle-exterior camera 35 may be a captured image of the road surface on which the road-surface rendered image 11 output in step ST3 is rendered. In this case, the vehicle-exterior camera 35 serves as a detection device that detects a detection image.

In step ST5, the CPU 44 compares the road-surface rendered image 11 in the captured image obtained by the vehicle-exterior camera 35 with the selected light projection pattern so as to start determining whether the road-surface rendering is adequate.

In this case, the CPU 44 may clip the detection image including the road-surface rendered image 11 from the captured image and compare the detection image with the selected light projection pattern. The position and the range of the road-surface rendered image 11 in the captured image can be identified based on the light projection direction and the light projection range used in the control in step ST3. Alternatively, the CPU 44 may generate a detection image directly facing the road-surface rendered image 11 based on, for example, an angle of the extending direction of the road surface with reference to the vehicle 1.

Then, in order to determine the overall agreement between the detection image and the selected light projection pattern, the CPU 44 first determines an inconsistency in the rendered shape.

For example, when light is projected onto an uneven or irregular road surface, the road-surface rendered image 11 and the captured detection image thereof include distortion according to the unevenness or the irregularities. In this case, there is a possibility that the driver who drives the vehicle 1 cannot comprehend the road-surface rendered image 11 since the driver is not able to ascertain the overall image even if the driver visually recognizes the road-surface rendered image 11 rendered on the road surface.

In addition, for example, when there is a hole in the road surface, the road-surface rendered image 11 and the captured detection image thereof include distortion according to the hole. In this case, there is a possibility that the driver who drives the vehicle 1 cannot comprehend the road-surface rendered image 11 since the driver is not able to ascertain the overall image even if the driver visually recognizes the road-surface rendered image 11 rendered on the road surface.

When the detection image includes any of these defects, the CPU 44 may determine that there is no overall agreement between the detection image and the selected light projection pattern. In this case, the CPU 44 causes the process to proceed to step ST8.

When the detection image does not include any of these defects, the CPU 44 may determine that there is overall agreement between the detection image and the selected light projection pattern. In this case, the CPU 44 causes the process to proceed to step ST6 for a further evaluation of the detection image.

In step ST6, the CPU 44 determines whether there is an overall light-quantity insufficiency with respect to the detection image.

For example, when the road surface reflects light easily, the quantity of light returning to the vehicle 1 decreases, possibly causing the overall brightness (light quantity) of the detection image to decrease.

The CPU 44 may determine whether an average brightness value of all the pixels constituting the detection image is larger than or equal to a threshold value.

In addition, for example, the CPU 44 may compare an average brightness value of some of the pixels constituting the detection image with a first threshold value.

The first threshold value may be a brightness value at which the driver who drives the vehicle 1 can conceivably visually recognize the road-surface rendered image 11 properly. For example, the first threshold value may change in accordance with the travel environment of the vehicle 1, such as between daytime and nighttime. Furthermore, the first threshold value may change in accordance with the on/off mode of the headlamp or the lighting mode thereof.

When the values to be compared with respect to the detection image include a value smaller than or equal to the first threshold value, the CPU 44 determines that there is an overall light-quantity insufficiency in the detection image and causes the process to proceed to step ST8.

When the values to be compared with respect to the detection image do not include a value smaller than or equal to the first threshold value, the CPU 44 determines that there is no overall light-quantity insufficiency in the detection image and causes the process to proceed to step ST7 for a further evaluation of the detection image.

In step ST7, the CPU 44 determines whether there is an insufficient reflection area in the detection image of the vehicle 1. For example, an insufficient reflection area refers to an area where reflection light returning from the road-surface rendered image 11 toward the driver who drives the vehicle 1 is insufficient when the road-surface rendered image 11 is oriented toward the driver who drives the vehicle 1. If there is an insufficient reflection area in the road-surface rendered image 11, the brightness in the insufficient reflection area may also be lower than other areas in the detection image in the captured image obtained by the vehicle-exterior camera 35.

For example, when the road-surface rendered image 11 partially overlaps the puddle 4, as illustrated in FIG. 1, the road-surface rendered image 11 may have an insufficient reflection area occurring in the overlapping area. In addition to the puddle 4, the road surface may also have snow, a maintenance hole, or the like.

The CPU 44 may determine whether the brightness value of each of the pixels constituting the detection image is smaller than or equal to a second threshold value.

For example, the second threshold value may be a brightness value corresponding to a difference for determining insufficient reflection with reference to an average brightness value of all or some of the pixels constituting the detection image.

Furthermore, with regard to pixels with brightness values smaller than or equal to the second threshold value, the CPU 44 may perform further determination with respect to the percentage of the number of pixels relative to all of the pixels constituting the detection image. The determination result indicates the aforementioned area when the percentage of the number of pixels is not 100%.

When pixels with brightness values smaller than or equal to the second threshold value are included at a predetermined percentage not equal to 100% as an area in the detection image, the CPU 44 determines that the detection image has an insufficient reflection area and causes the process to proceed to step ST8.

When pixels with brightness values smaller than or equal to the second threshold value are included at below the predetermined percentage or higher in the detection image, the CPU 44 determines that there is no insufficient reflection area in the detection image and causes the process to proceed to step ST9.

In step ST8, the CPU 44 discontinues the road-surface rendering. The CPU 44 stops the road-surface irradiation started in step ST3. Accordingly, the rendering of the road-surface rendered image 11 on the road surface is discontinued. Subsequently, the CPU 44 ends the control.

In contrast, when the process is not to proceed to step ST8, that is, when the process is to proceed from step ST7 to step ST9, the CPU 44 continues with the road-surface irradiation started in step ST3.

In step ST9, the CPU 44 determines whether the road-surface rendering is to be terminated. The CPU 44 may determine that the road-surface rendering is to be terminated when, for example, there is no request for road-surface rendering. In this case, the CPU 44 ends the control.

For example, when there is a request remaining for road-surface rendering, the CPU 44 determines that the road-surface rendering is not to be terminated, and causes the process to return to step ST2. In this case, the CPU 44 repeats the process from step ST2 to step ST9 so as to continue with the road-surface rendering.

Accordingly, the CPU 44 at least determines insufficient reflection in the road-surface rendered image 11 based on the road-surface detection (i.e., the captured image) by the vehicle-exterior camera 35 serving as a detection device, so as to be capable of controlling the light projection for the road-surface rendering. When an insufficient reflection area has occurred in the detection image at the predetermined percentage or higher, control can be performed for stopping the light projection for the road-surface rendering from the light projection modules 53.

Furthermore, with regard to the detection image of the road-surface rendered image 11 that is not entirely inconsistent with the light projection pattern, the CPU 44 determines overall insufficient reflection with respect to the brightness of the detection image and determines a brightness difference at least in multiple areas of the detection image, so as to be capable of determining whether there is an insufficient reflection area. When there is an insufficient reflection area in the detection image, the CPU 44 can perform suppression by discontinuing the light projection for the road-surface rendering.

Alternatively, in step ST8, the CPU 44 may reduce the light quantity instead of stopping the light projection.

Figure 5:
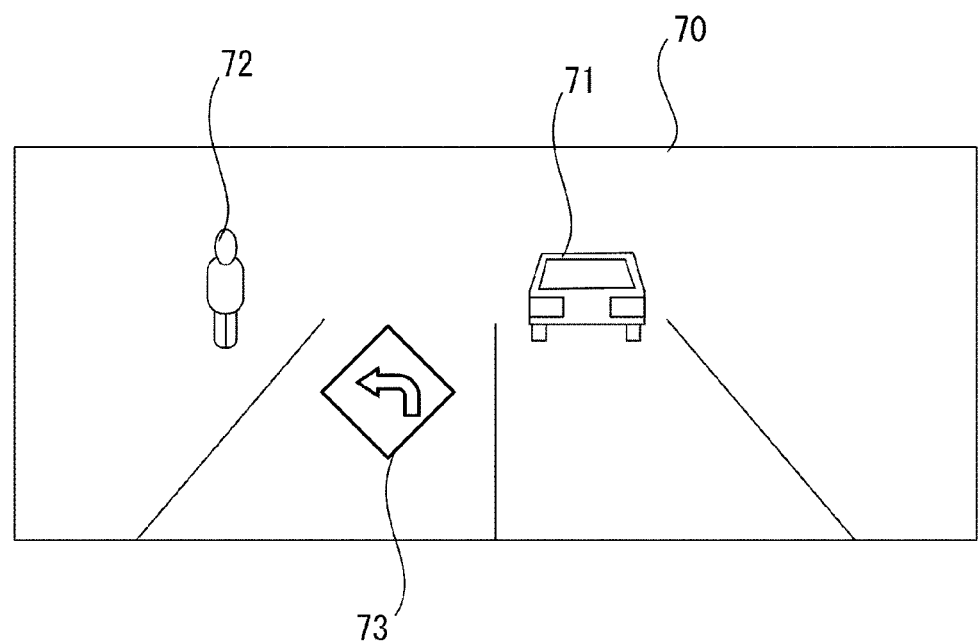
FIG. 5 illustrates a captured image obtained by a vehicle-exterior camera in FIG. 2.

FIG. 5 illustrates a captured image 70 obtained by the vehicle-exterior camera 35 in FIG. 2.

The captured image 70 in FIG. 5 is captured by the vehicle-exterior camera 35 of the vehicle 1 in the traveling state in FIG. 1.

Therefore, the captured image 70 in FIG. 5 includes an image 71 of the oncoming vehicle 2, an image 72 of the pedestrian 3, and a detection image 73 of the road-surface rendered image 11, together with the road on which the vehicle 1 is traveling.

The following description with reference to FIG. 6 to FIG. 9 relates to an example of the detection image 73 including an insufficient reflection area where the quantity of light returning toward the driver who drives the vehicle 1 is insufficient.

Figure 6:
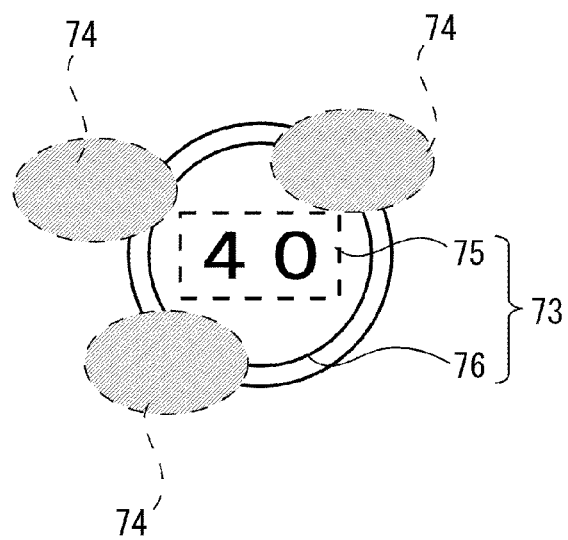
FIG. 6 illustrates a first example of a detection image, in road-surface rendering, included in the captured image.

FIG. 6 illustrates a first example of the detection image 73, in the road-surface rendering, included in the captured image 70.

Figure 7:
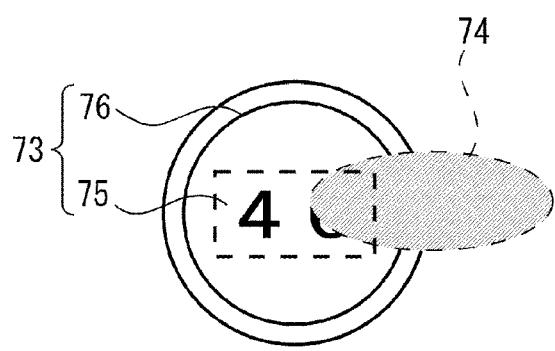
FIG. 7 illustrates a second example of the detection image, in the road-surface rendering, included in the captured image.

FIG. 7 illustrates a second example of the detection image 73, in the road-surface rendering, included in the captured image 70.

The detection image 73 in the road-surface rendering in FIG. 6 and the detection image 73 in the road-surface rendering in FIG. 7 each relate to the road-surface rendered image 11 based on the speed-limit light projection pattern 62.

In the detection image 73 according to the first example in FIG. 6, the upper right area, the upper left area, and the lower left area have image deficiencies 74 occurring therein as a result of intense reflection occurring due to the puddle 4, such that the quantity of light toward the driver who drives the vehicle 1 is insufficient. However, a main area 75 in the middle of the detection image 73 displaying a speed-limit value is not deficient.

In this case, in step ST7 in FIG. 4, the CPU 44 according to this embodiment may determine that the detection image 73 includes an insufficient reflection area at the predetermined percentage or higher, and may discontinue the rendering in step ST8.

In the detection image 73 according to the second example in FIG. 7, a large area from the right side toward the middle has an image deficiency 74 occurring therein as a result of intense reflection occurring due to the puddle 4, such that the quantity of light toward the driver who drives the vehicle 1 is insufficient. In this case, the main area 75 in the middle of the detection image 73 displaying the speed-limit value is also deficient.

In this case, in step ST7 in FIG. 4, the CPU 44 according to this embodiment may determine that the detection image 73 includes an insufficient reflection area at the predetermined percentage or higher, and may discontinue the rendering in step ST8.

Figure 8:
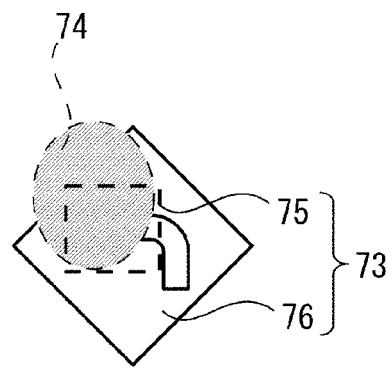
FIG. 8 illustrates a third example of the detection image, in the road-surface rendering, included in the captured image.

FIG. 8 illustrates a third example of the detection image 73, in the road-surface rendering, included in the captured image 70.

Figure 9:
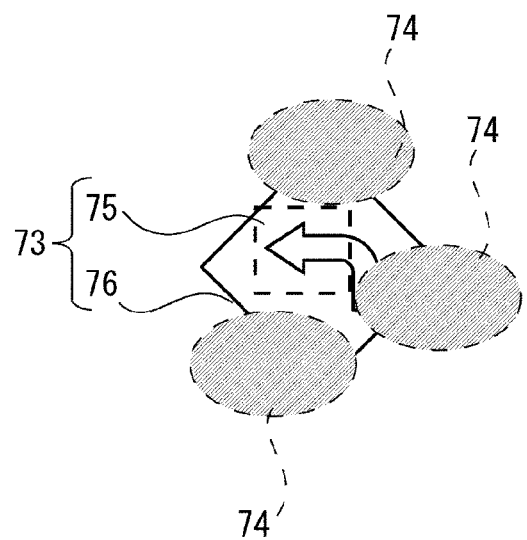
FIG. 9 illustrates a fourth example of the detection image, in the road-surface rendering, included in the captured image.

FIG. 9 illustrates a fourth example of the detection image 73, in the road-surface rendering, included in the captured image 70.

The detection image 73 in the road-surface rendering in FIG. 8 and the detection image 73 in the road-surface rendering in FIG. 9 each relate to the road-surface rendered image 11 based on the left-turn-indication light projection pattern 61.

In the detection image 73 according to the third example in FIG. 8, a large area from the upper left corner toward the middle has an image deficiency 74 occurring therein as a result of intense reflection occurring due to the puddle 4, such that the quantity of light toward the driver who drives the vehicle 1 is insufficient. In this case, in the main area 75 in the middle of the detection image 73, the tip area of an arrow indicating the traveling direction is deficient.

In this case, in step ST7 in FIG. 4, the CPU 44 according to this embodiment may determine that the detection image 73 includes an insufficient reflection area at the predetermined percentage or higher, and may discontinue the rendering in step ST8.

In the detection image 73 according to the fourth example in FIG. 9, the upper area, the right area, and the lower area have image deficiencies 74 occurring therein as a result of intense reflection occurring due to the puddle 4, such that the quantity of light toward the driver who drives the vehicle 1 is insufficient. However, in the main area 75 in the middle of the detection image 73, the tip area of the arrow indicating the traveling direction is not deficient.

In this case, in step ST7 in FIG. 4, the CPU 44 according to this embodiment may determine that the detection image 73 includes an insufficient reflection area at the predetermined percentage or higher, and may discontinue the rendering in step ST8.

Accordingly, in this embodiment, the CPU 44 that controls the light projection for the road-surface rendering at least determines insufficient reflection in the road-surface rendering based on the road-surface detection (i.e., the captured image 70) by the vehicle-exterior camera 35 serving as a detection device provided in the vehicle 1. Then, the CPU 44 controls the light projection for the road-surface rendering based on, for example, the insufficient reflection in the detection image 73. Accordingly, in this embodiment, for example, supposing that the road-surface rendered image 11 rendered on the road surface is entirely pale and difficult to visually recognize from the driver who drives the vehicle 1 performing the road-surface rendering, control can be performed to suppress the light projection for the road-surface rendering by discontinuing the rendering. This embodiment can prevent continuous execution of road-surface rendering where sufficient visibility is not obtainable. The driver who drives the oncoming vehicle 2 and the pedestrian 3 walking toward the vehicle 1 can be prevented from continuously receiving intense light via the road surface as a result of total reflection occurring on the road surface.

In particular, in this embodiment, the vehicle-exterior camera 35 can detect the detection image 73 of the road-surface rendered image 11 projected on the road surface by image-capturing. The CPU 44 that controls the light projection for the road-surface rendering determines whether the detection image 73 detected by the vehicle 1 has an insufficient reflection area. If an insufficient reflection area has occurred at a predetermined area percentage, the CPU 44 suppresses the light projection for the road-surface rendering by discontinuing the light projection. Accordingly, in this embodiment, even when the road-surface rendered image 11 rendered on the road surface is partially difficult to visually recognize from, for example, the driver who drives the vehicle 1 performing the road-surface rendering, control can be performed by discontinuing the light projection for the road-surface rendering. In this embodiment, even when the road-surface rendered image 11 rendered on the road surface is partially deficient, continuous execution of the road-surface rendering can be prevented. Furthermore, the driver who drives the oncoming vehicle 2 and the pedestrian 3 walking toward the vehicle 1 can be prevented from continuously receiving intense light via the road surface as a result of intense reflection occurring on the road surface in the deficient area.

Accordingly, in this embodiment, the road-surface rendering from the vehicle 1 involves suppression to prevent the light projection for the road-surface rendering from being excessive, so that an improvement in the road-surface rendering by the vehicle 1 can be expected.

Second Embodiment

Next, a road-surface rendering device of the vehicle 1 according to a second embodiment of the disclosure will be described.

This embodiment relates to an example where rendering can be continuously performed even when a deficiency caused by an insufficient light quantity occurs in the road-surface rendered image 11.

The following description mainly relates to differences from the above embodiment.

Figure 10:
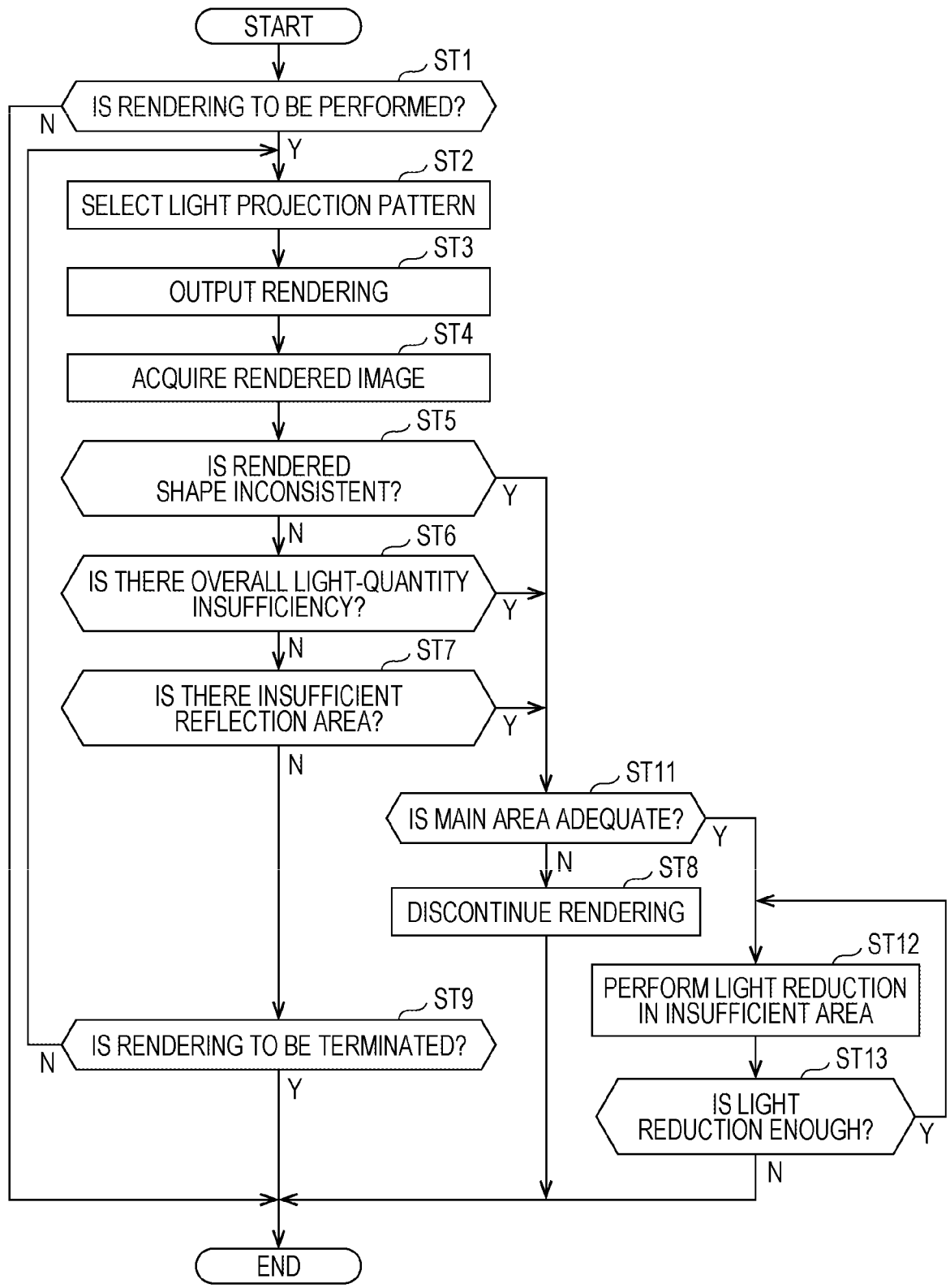
FIG. 10 is a flowchart of road-surface rendering control according to an embodiment executed by the rendering controller in FIG. 2.

FIG. 10 is a flowchart of road-surface rendering control according to the second embodiment executed by the rendering controller 21 in FIG. 2.

The CPU 44 serving as a control unit of the rendering controller 21 repeatedly executes the road-surface rendering control in FIG. 10.

When the rendering control function is implemented in the headlamp controller 22 in the control system 20, the CPU of the headlamp controller 22 may repeatedly execute the road-surface rendering control in FIG. 10.

Step ST1 to step ST9 are similar to those in the above embodiment.

However, if it is determined in step ST5 that the detection image 73 does not entirely match the selected light projection pattern, the CPU 44 causes the process to proceed to step ST11.

If it is determined in step ST6 that there is an overall light-quantity insufficiency in the detection image 73, the CPU 44 causes the process to proceed to step ST11.

If it is determined in step ST7 that there is an insufficient reflection area with respect to the detection image 73 in the vehicle 1, the CPU 44 causes the process to proceed to step ST11.

In step ST11, the CPU 44 further determines whether the rendering is adequate based on the main area 75 of the detection image 73.

Then, for example, when a deficiency caused by an insufficient light quantity has not occurred in the main area 75 of the detection image 73 corresponding to the main area 75 of the light projection pattern even if there is a large deficiency caused by the puddle 4 in the entire detection image 73, the CPU 44 may determine that the rendering is adequate. In this case, the CPU 44 causes the process to proceed to step ST12.

In contrast, when the main area 75 of the detection image 73 corresponding to the main area 75 of the light projection pattern has a deficiency caused by an insufficient light quantity, it may be determined that the rendering is inadequate. In this case, the CPU 44 causes the process to proceed to step ST8. In this case, the CPU 44 discontinues the road-surface rendering and ends the control.

In step ST12, the CPU 44 partially suppresses the light projection with respect to the area with the insufficient light quantity in the detection image 73.

In this case, the CPU 44 performs light reduction to reduce the quantity of projected light with respect to the area with the insufficient light quantity in the detection image 73.

In step ST13, the CPU 44 acquires the latest captured image 70 obtained by the vehicle-exterior camera 35 and determines whether the reduced quantity for light the area with the insufficient light quantity in the detection image 73 is enough.

If the reduced quantity of light is not enough, the CPU 44 causes the process to return to step ST12. The CPU 44 repeats the process from step ST12 to step ST13 until the reduced quantity of light becomes enough.

When the reduced quantity of light becomes enough, the CPU 44 ends the control.

Accordingly, in this embodiment, when the detection image 73 detected by the vehicle-exterior camera 35 serving as a detection device provided in the vehicle 1 has an insufficient reflection area, the CPU 44 that controls the light projection for the road-surface rendering determines the relationship that the insufficient reflection area has with the main area of the light projection pattern. Then, if the main area 75 of the detection image 73 corresponding to the main area of the light projection pattern is rendered without being an insufficient reflection area, the quantity of projected light with respect to the area with the insufficient reflection in the detection image 73 can be reduced and suppressed.

For example, in the detection image 73 according to the aforementioned first example in FIG. 6, the main area 75 in the middle of the detection image 73 displaying the speed-limit value is not deficient.

In this case, the CPU 44 according to this embodiment may determine in step ST11 in FIG. 10 that the rendering is adequate since the main area 75 is not deficient, and may execute the light reduction process from step ST12 to step ST13 with respect to the area with the insufficient reflection caused by the puddle 4.

In contrast, in the detection image 73 according to the second example in FIG. 7, the main area 75 in the middle of the detection image 73 displaying the speed-limit value is deficient.

In this case, the CPU 44 according to this embodiment may determine in step ST11 in FIG. 10 that the rendering is inadequate since the main area 75 is deficient, and may discontinue the rendering in step ST8.

In the detection image 73 according to the third example in FIG. 8, the tip area of the arrow indicating the traveling direction in the main area 75 in the middle of the detection image 73 is deficient.

In this case, the CPU 44 according to this embodiment may determine in step ST11 in FIG. 10 that the rendering is inadequate since the main area 75 is deficient, and may discontinue the rendering in step ST8.

In contrast, in the detection image 73 according to the fourth example in FIG. 9, the tip area of the arrow indicating the traveling direction in the main area 75 in the middle of the detection image 73 is not deficient.

In this case, the CPU 44 according to this embodiment may determine in step ST11 in FIG. 10 that the rendering is adequate since the main area 75 is not deficient, and may execute the light reduction process from step ST12 to step ST13 with respect to the area with the insufficient reflection caused by the puddle 4.

Third Embodiment

Next, a road-surface rendering device of the vehicle 1 according to a third embodiment of the disclosure will be described.

This embodiment relates to an example involving controlling the road-surface rendering by predicting an occurrence of a deficiency caused by an insufficient light quantity in the road-surface rendered image 11.

The following description mainly relates to differences from the above embodiments.

Figure 11:
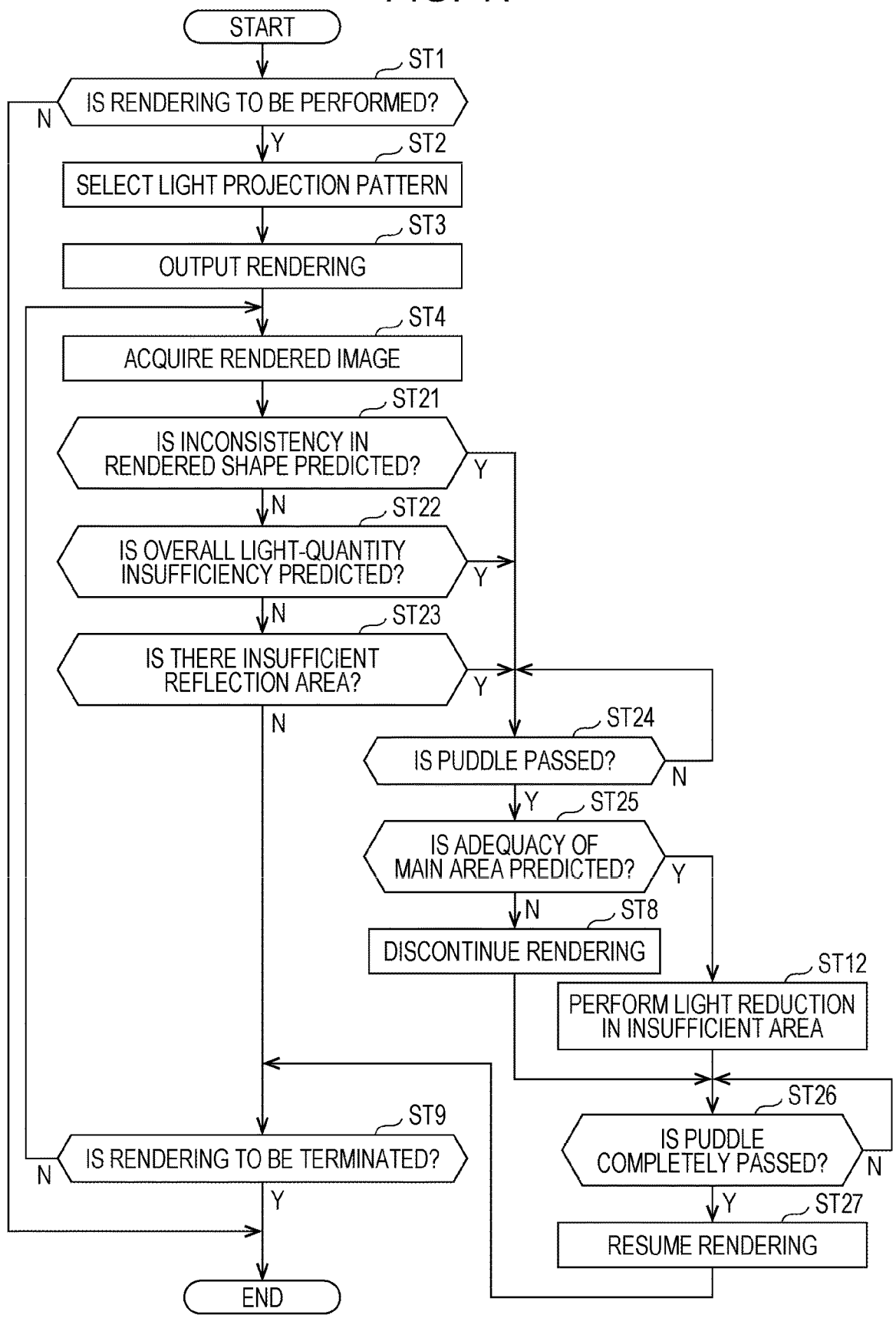
FIG. 11 is a flowchart of road-surface rendering control according to an embodiment executed by the rendering controller in FIG. 2.

FIG. 11 is a flowchart of road-surface rendering control according to the third embodiment executed by the rendering controller 21 in FIG. 2.

The CPU 44 serving as a control unit of the rendering controller 21 repeatedly executes the road-surface rendering control in FIG. 11.

When the rendering control function is implemented in the headlamp controller 22 in the control system 20, the CPU of the headlamp controller 22 may repeatedly execute the road-surface rendering control in FIG. 11.

Step ST1 to step ST9 and step ST12 are similar to those in the above embodiments.

However, after step ST4, the CPU 44 causes the process to proceed to step ST21.

In step ST21, the CPU 44 uses the captured image 70 acquired in step ST4 to predict and determine whether the road-surface rendering is adequate based on a deformation in the road-surface rendered image 11 when the vehicle 1 travels.

For example, when the road-surface rendered image 11 detected as the detection image 73 travels together with the vehicle 1, the CPU 44 may determine whether the road-surface rendered image 11 overlaps, for example, a step, a protrusion or recess, or a hole in the road surface.

Then, when the CPU 44 predicts and determines that the road-surface rendered image 11 is to deform by overlapping, for example, a step on the road surface, the CPU 44 causes the process to proceed to step ST24.

If the CPU 44 predicts and determines that the road-surface rendered image 11 is not to deform, the CPU 44 causes the process to proceed to step ST22.

In step ST22, the CPU 44 uses the captured image 70 acquired in step ST4 to predict and determine whether the road-surface rendering is adequate based on an overall light-quantity insufficiency in the road-surface rendered image 11 when the vehicle 1 travels.

For example, when the captured detection image 73 of the road-surface rendered image 11 travels together with the vehicle 1, the CPU 44 may determine whether the detection image 73 entirely overlaps an insufficient reflection area of the road surface. In this case, the CPU 44 extracts an area where the quantity of reflected light is smaller than those in other areas as an insufficient reflection area of the road surface within the high-beam irradiation range included in the captured image 70. Then, the CPU 44 may determine whether the detection image 73 entirely overlaps the insufficient reflection area of the road surface based on the relationship between the position and range of the insufficient reflection area with respect to the high beam and the position and range of the detection image 73.

Then, when the CPU 44 predicts and determines that the detection image 73 entirely overlaps the insufficient reflection area of the road surface, the CPU 44 causes the process to proceed to step ST24.

If the CPU 44 predicts and determines that the detection image 73 does not entirely overlap the insufficient reflection area of the road surface, the CPU 44 causes the process to proceed to step ST23.

In step ST23, the CPU 44 uses the captured image 70 acquired in step ST4 to predict and determine whether the road-surface rendering is adequate based on a partial light-quantity insufficiency in the road-surface rendered image 11 when the vehicle 1 travels.

For example, when the captured detection image 73 of the road-surface rendered image 11 travels together with the vehicle 1, the CPU 44 may determine whether the detection image 73 partially overlaps the insufficient reflection area of the road surface.

Furthermore, when the main area 75 of the captured detection image 73 of the road-surface rendered image 11 travels together with the vehicle 1, the CPU 44 may determine whether the main area 75 partially overlaps the insufficient reflection area of the road surface.

Then, when the CPU 44 predicts and determines that the detection image 73 partially overlaps the insufficient reflection area of the road surface, the CPU 44 causes the process to proceed to step ST24.

If the CPU 44 predicts and determines that the detection image 73 does not partially overlap the insufficient reflection area of the road surface, the CPU 44 causes the process to proceed to step ST9. In this case, the CPU 44 continues with the road-surface rendering.

In step ST24, the CPU 44 determines whether the road-surface rendered image 11 starts to pass the insufficient reflection area that has undergone the prediction and determination.

For example, the CPU 44 can calculate the timing at which the road-surface rendered image 11 starts to pass the insufficient reflection area of the road surface based on the distance between the road-surface rendered image 11 and the insufficient reflection area of the road surface and the speed of the vehicle 1.

If the calculated timing is not measured by the timer 42, the CPU 44 repeats this process. Then, when the calculated timing is measured by the timer 42, the CPU 44 determines that the road-surface rendered image 11 is to start passing the insufficient reflection area that has undergone the prediction and determination, and causes the process to proceed to step ST25.

In step ST25, when the road-surface rendered image 11 passes the insufficient reflection area of the road surface, the CPU 44 determines whether a deficiency caused by an insufficient light quantity occurs in the main area 75 of the road-surface rendered image 11.

When the CPU 44 determines that a deficiency caused by an insufficient light quantity occurs in the main area 75 of the road-surface rendered image 11, the CPU 44 causes the process to proceed to step ST8. In this case, the CPU 44 discontinues the road-surface rendering and causes the process to proceed to step ST26.

In contrast, if the CPU 44 determines that a deficiency caused by an insufficient light quantity does not occur in the main area 75 of the road-surface rendered image 11, the CPU 44 causes the process to proceed to step ST12. In this case, the CPU 44 performs light reduction with respect to a remaining area 76 other than the main area 75 of the road-surface rendered image 11. The CPU 44 may perform the light reduction with respect to an area where a deficiency caused by an insufficient light quantity occurs in the remaining area 76 of the road-surface rendered image 11. Subsequently, the CPU 44 causes the process to proceed to step ST26.

In step ST26, the CPU 44 determines whether the road-surface rendered image 11 completely passes the insufficient reflection area that has undergone the prediction and determination.

For example, the CPU 44 can calculate the timing at which the road-surface rendered image 11 completely passes the insufficient reflection area of the road surface based on the distance between the road-surface rendered image 11 and the insufficient reflection area of the road surface and the speed of the vehicle 1.

If the calculated timing is not measured by the timer 42, the CPU 44 repeats this process. Then, when the calculated timing is measured by the timer 42, the CPU 44 determines that the road-surface rendered image 11 has passed the insufficient reflection area that has undergone the prediction and determination, and causes the process to proceed to step ST27.

In step ST27, the CPU 44 resumes the road-surface rendering. Similar to step ST3, the CPU 44 controls the light projection module 53 of the right headlamp module 31 and the light projection module 53 of the left headlamp module 32 to irradiate the road surface with light according to the selected light projection pattern. Accordingly, the projection of the road-surface rendered image 11 corresponding to the light projection pattern resumes on the road surface. Subsequently, the CPU 44 causes the process to proceed to step ST9.

FIG. 12 illustrates a change in the road-surface rendering under the road-surface rendering control in FIG. 11.

In FIG. 12, time elapses from a time point T1 toward a time point T3.

The vehicle 1 travels from right to left in the drawing. In this case, the road-surface rendered image 11 also moves from right to left in the drawings.

At each time point in FIG. 12, the puddle 4 is illustrated together with the road-surface rendered image 11.

At the time point T1, the puddle 4 exists in the traveling direction of the road-surface rendered image 11. In this case, the CPU 44 performs step ST22 or step ST23 in FIG. 11, and subsequently determines whether the road-surface rendered image 11 starts to pass the puddle 4 in step ST24.

Then, at the time point T2, the road-surface rendered image 11 overlaps the puddle 4. In this case, the CPU 44 performs step ST8 or step ST12 in FIG. 11 so as to discontinue the rendering. The road surface is not irradiated with the light for the road-surface rendered image 11. The CPU 44 may execute light reduction for the insufficient reflection area in the rendered image.

Subsequently, at the time point T3, the road-surface rendered image 11 has passed the puddle 4. In this case, the CPU 44 performs, for example, step ST27 in FIG. 11 so as to resume the rendering. The road surface is irradiated with the light for the road-surface rendered image 11.

Accordingly, the CPU 44 discontinues the road-surface rendering or performs the light reduction during the period in which the road-surface rendered image 11 overlaps the puddle 4 on the road surface, and can resume the road-surface rendering after the road-surface rendered image 11 has passed the puddle 4.

Accordingly, in this embodiment, the CPU 44 at least predicts and determines insufficient reflection in the road-surface rendering based on detection by the vehicle-exterior camera 35 with respect to the road surface illuminated by the headlamp, so as to be capable of controlling the light projection for the road-surface rendering.

For example, the CPU 44 determines insufficient reflection with respect to the road surface in the headlamp light projection range located forward in the traveling direction of the vehicle 1 relative to the road-surface position receiving the light projected for the road-surface rendering, so as to be capable of predicting and determining insufficient reflection in the road-surface rendering.

Although the above embodiments are examples of preferred embodiments of the disclosure, the embodiments of the disclosure are not limited thereto and permit various modifications and alterations so long as they do not depart from the scope of the embodiments of the disclosure.

In the above embodiments, each light projection module 53 serving as a light projection member is provided in the vehicle 1 integrally with the headlamp LEDs 51 and 52 in the right headlamp module 31 or the left headlamp module 32.

Alternatively, for example, each light projection module 53 serving as a light projection member may be provided in the vehicle 1 separately from the right headlamp module 31 or the left headlamp module 32.

Furthermore, the vehicle 1 may be provided with a single light projection module 53 or three or more light projection modules 53. The single light projection module 53 or the third light projection module 53 may be provided at the widthwise center of the front surface of the vehicle 1.

In the above embodiments of the disclosure, the control unit that controls the light projection for the road-surface rendering by the light projection member at least determines insufficient reflection in the road-surface rendering in the vehicle based on road-surface detection by the detection device. Then, the control unit performs control to suppress the light projection for the road-surface rendering based on the insufficient reflection in the vehicle. Accordingly, in the embodiments of the disclosure, for example, supposing that an image rendered on the road surface is entirely pale and difficult to visually recognize from a driver who drives the vehicle performing the road-surface rendering, control can be performed to suppress the light projection for the road-surface rendering.

The embodiments of the disclosure can prevent continuous execution of road-surface rendering where sufficient visibility is not obtainable.

If the road surface is to totally reflect light to cause, for example, intense regular reflection to occur, a driver who drives an oncoming vehicle and a pedestrian walking toward the vehicle can expectedly be prevented from being continuously irradiated with intense light from the headlamp via the road surface.

In the embodiments of the disclosure, an improvement in the road-surface rendering from the vehicle can be expected by controlling the light projection for the road-surface rendering.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the rendering controller 21, the headlamp controller 22, the operation controller 23, the detection controller 24, the communication controller 25, and the vehicle network 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle having a road-surface rendering function, the vehicle comprising:
a light projection member configured to perform light projection for road-surface rendering at least toward a road surface ahead of the vehicle;
a control unit configured to control the light projection for the road-surface rendering by the light projection member; and
a detection device configured to perform detection of the road surface onto which the light projection member performs the light projection for the road-surface rendering,
wherein the control unit is configured to perform control to suppress the light projection for the road-surface rendering by at least determining insufficient reflection in the road-surface rendering in the vehicle based on the detection of the road surface by the detection device.

2. The vehicle having the road-surface rendering function according to claim 1,
wherein the detection device is configured to detect, as a detection image, an image rendered in accordance with the light projection on the road surface, and
wherein the control unit is configured to:
determine an insufficient reflection area in the detection image detected by the detection device with respect to the road-surface rendering; and
when the insufficient reflection area has occurred, suppress the light projection for the road-surface rendering from the light projection member.

3. The vehicle having the road-surface rendering function according to claim 2,
wherein the control unit is configured to:
compare the detection image detected by the detection device with a light projection pattern projected by the light projection member; and
determine whether the detection image that is not entirely inconsistent with the light projection pattern has the insufficient reflection area exists in.

4. The vehicle having the road-surface rendering function according to claim 3,
wherein the control unit is configured to:
when the detection image detected by the detection device has the insufficient reflection area, determine a relationship that the insufficient reflection area has with the light projection pattern, and
when a main area of the light projection pattern is rendered, suppress the light projection for the road-surface rendering by reducing the light projection toward the insufficient reflection area.

5. The vehicle having the road-surface rendering function according to claim 4, further comprising:
a headlamp member configured to project light forward of the vehicle,
wherein the control unit is configured to perform control for suppressing the light projection for the road-surface rendering by at least predicting and determining insufficient reflection in the road-surface rendering based on the detection by the detection device with respect to the road surface receiving the light projected by the headlamp member.

6. The vehicle having the road-surface rendering function according to claim 5,
wherein the control unit is configured to at least predict and determine the insufficient reflection in the road-surface rendering by determining the insufficient reflection with respect to the road surface in a light projection range of the headlamp member located forward of the vehicle in a traveling direction of the vehicle relative to a road-surface position onto which the light projection member performs the light projection for the road-surface rendering.

7. The vehicle having the road-surface rendering function according to claim 2, further comprising:
a headlamp member configured to project light forward of the vehicle,
wherein the control unit is configured to perform control for suppressing the light projection for the road-surface rendering by at least predicting and determining insufficient reflection in the road-surface rendering based on the detection by the detection device with respect to the road surface receiving the light projected by the headlamp member.

8. The vehicle having the road-surface rendering function according to claim 7,
wherein the control unit is configured to at least predict and determine the insufficient reflection in the road-surface rendering by determining the insufficient reflection with respect to the road surface in a light projection range of the headlamp member located forward of the vehicle in a traveling direction of the vehicle relative to a road-surface position onto which the light projection member performs the light projection for the road-surface rendering.

9. The vehicle having the road-surface rendering function according to claim 3, further comprising:
a headlamp member configured to project light forward of the vehicle,
wherein the control unit is configured to perform control for suppressing the light projection for the road-surface rendering by at least predicting and determining insufficient reflection in the road-surface rendering based on the detection by the detection device with respect to the road surface receiving the light projected by the headlamp member.

10. The vehicle having the road-surface rendering function according to claim 9,
wherein the control unit is configured to at least predict and determine the insufficient reflection in the road-surface rendering by determining the insufficient reflection with respect to the road surface in a light projection range of the headlamp member located forward of the vehicle in a traveling direction of the vehicle relative to a road-surface position onto which the light projection member performs the light projection for the road-surface rendering.

11. The vehicle having the road-surface rendering function according to claim 1, further comprising:
a headlamp member configured to project light forward of the vehicle,
wherein the control unit is configured to perform control for suppressing the light projection for the road-surface rendering by at least predicting and determining insufficient reflection in the road-surface rendering based on the detection by the detection device with respect to the road surface receiving the light projected by the headlamp member.

12. The vehicle having the road-surface rendering function according to claim 11,
wherein the control unit is configured to at least predict and determine the insufficient reflection in the road-surface rendering by determining the insufficient reflection with respect to the road surface in a light projection range of the headlamp member located forward of the vehicle in a traveling direction of the vehicle relative to a road-surface position onto which the light projection member performs the light projection for the road-surface rendering.

13. A vehicle having a road-surface rendering function, the vehicle comprising:
a light projection member including a light source and configured to perform light projection for road-surface rendering at least toward a road surface ahead of the vehicle; and
circuitry configured to
control the light projection for the road-surface rendering by the light projection member,
perform detection of the road surface onto which the light projection member performs the light projection for the road-surface rendering, and
perform control to suppress the light projection for the road-surface rendering by at least determining insufficient reflection in the road-surface rendering in the vehicle based on the detection of the road surface.

* * * * *